United States Patent [19]
Roth

[11] Patent Number: 4,588,628
[45] Date of Patent: May 13, 1986

[54] FLOOR MAT

[75] Inventor: David W. Roth, Grosse Pointe Park, Mich.

[73] Assignee: The 2500 Corporation, Birmingham, Mich.

[21] Appl. No.: 658,643

[22] Filed: Oct. 9, 1984

Related U.S. Application Data

[63] Continuation-in-part of Ser. No. 444,986, Nov. 29, 1982, Pat. No. 4,481,240, which is a continuation-in-part of Ser. No. 131,262, Mar. 17, 1980, Pat. No. 4,361,610.

[51] Int. Cl.$^4$ .............. B32B 3/06; B60J 9/00
[52] U.S. Cl. .............. 428/85; 296/1 F; 428/95; 428/99; 428/100; 428/131; 428/189; 428/192
[58] Field of Search ........ 428/99, 100, 85, 88, 428/90, 91, 95, 92, 189, 47, 131; 296/1 F; 15/215, 217, 238; D12/203

[56] References Cited

U.S. PATENT DOCUMENTS

| | | | |
|---|---|---|---|
| 3,823,058 | 7/1974 | Yamaguchi | 296/1 F |
| 4,086,679 | 5/1978 | Butler | 296/1 F |
| 4,481,240 | 11/1984 | Roth | 296/1 F |

*Primary Examiner*—Paul J. Thibodeau
*Attorney, Agent, or Firm*—Gifford, Groh, Sheridan, Sprinkle & Dolgorukov

[57] ABSTRACT

There is disclosed an improved floor mat construction, including a floor mat having at least one carpeted surface to which is attached, via suitable attaching means, a retainer to prevent movement of the floor mat relative to a vehicle carpet. The retainer generally has an upper bristled surface and a lower bristled surface divided by a planar surface. One or both of said upper bristled surface and said lower bristled surface may be tapered for all or part of its length.

26 Claims, 15 Drawing Figures

FLOOR MAT

CROSS REFERENCES TO RELATED APPLICATIONS

The present application is a continuation-in-part of my co-pending U.S. Letters Patent application Ser. No. 06/444,986, filed Nov. 29, 1982, entitled, "Floor Mat Mounting System", now U.S. Pat. No. 4,481,240 which is a continuation-in-part of my U.S. Letters Patent application Ser. No. 131,262, filed Mar. 17, 1980, entitled, "Non-Skid Carpet Protector", now U.S. Pat. No. 4,361,610. The benefit of the filing dates of the earlier continuation-in-part application and U.S. patent are hereby specifically claimed.

BACKGROUND OF THE INVENTION

1. Field of Invention

The present invention relates to an improved floor mat, portions of which have been disclosed in said earlier U.S. Pat. Nos. 4,361,610 and 4,481,240. The portions of said earlier applications which are not repeated in the present application are specifically incorporated herein by reference.

The improvements disclosed in the present continuation-in-part application relate to a retainer for preventing movement of a floor mat when installed in a motor vehicle. The disclosed retainer may be perforated for saving weight, may be permanently or removably attached to the floor mat, and may be tapered when the floor mat is intended to be used in certain applications to be discussed.

2. Description of the Prior Art

A review of the prior art will show that there are many patents which relate to the use of removable vehicle floor mats to protect the underlying carpet area, but to the best of my knowledge none of these have had any commerical success, nor have they been acceptable to retail consumers or the business community, nor have any of these carpet protectors solved the problems associated with movement during vehicle entry and exit. My aforementioned U.S. Pat. Nos. 4,361,610 and 4,481,240 describe how I have solved the problem of the movement of the vehicle floor mat during operation of the vehicle, as well as during entry and exit. However, as automotive technology has progressed, the need to save weight has increased, and the need for improvement, even to these devices, has become evident.

SUMMARY OF THE INVENTION

In order to solve the weight problem, and still have a retainer which does not move during operation of the motor vehicle, or during entry and exit from the same, I have provided a perforated retainer which is hingedly mounted to the floor mat. In a modification of my invention, the retainer is tapered. The use of these devices provides a retainer which is light in weight, and which can vary an area considerably, and still hold my improved floor mat stationary.

Thus, it is an object of the present invention to provide an improved light weight carpet protector which will remain in place during operation of the vehicle, as well as during entry and exit by occupants of a motor vehicle.

A further object of the present invention is to provide an improved floor mat which is easily removable and replaceable on the floor of a motor vehicle.

A further object of the present invention is to provide an improved light weight non-skid floor mat having a retainer hingedly mounted thereto.

A further object of the present invention is to provide a floor mat of the foregoing nature which is reversible, and wherein said hingedly mounted retainer can be affixed to either side of the floor mat.

It is a further object of the present invention to provide an improved floor mat having a retainer mounted thereon to prevent movement during operation of the motor vehicle, as well as during entry and exit therefrom, and to have said retainer perforated to save weight.

A still further object of the present invention is to provide an improved floor mat having a hingedly mounted tapered retainer which may be of different sizes depending upon the area of my improved floor mat.

Further objects and advantages of the present invention will be apparent from the following description and appended claims, reference being made to the accompanying drawings forming a part of this specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description and not of limitation.

DESCRIPTION OF THE PREFERRED EMBODIMENT

Figure 1:
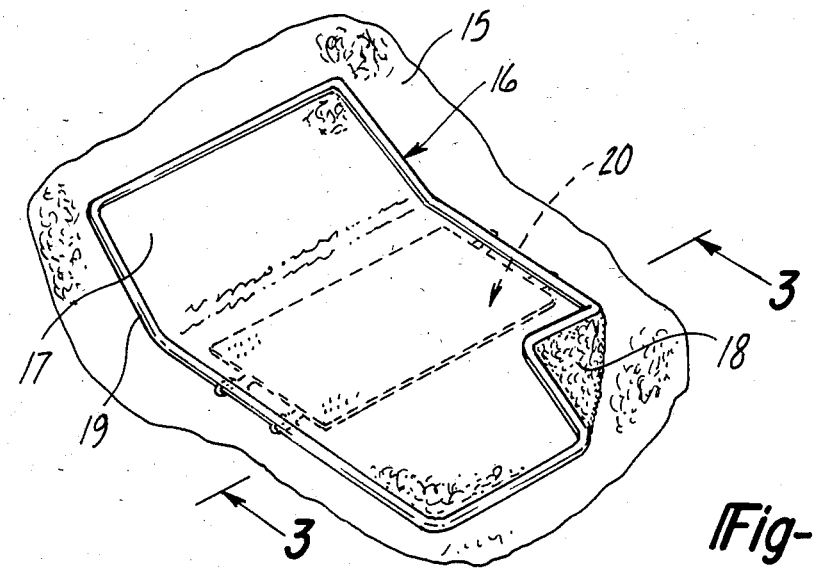
FIG. 1 is a perspective view of my improved floor mat construction.

Referring to FIG. 1, there is shown a floor mat embodying the present invention generally designated by the numeral 16 and adapted to be placed over the carpet cover material 15 found on the floor of an automotive vehicle. The floor mat is usually, but not necessarily, constructed of two like pieces of carpeting placed back-to-back and bound by a suitable edge binding to produce an upper carpeted surface 17, and a lower carpeted surface 18 bound by the edge binding 19.

A retainer, generally designated by the numeral 20, is shown operatively mounted to the underside of the floor mat 16. The means of mounting the retainer 20 to the floor mat 16 can be seen by referring to FIGS. 2 and 8.

It can be seen that a hook like tab 21 is integrally formed near each corner of the retainer 20 and fits in a mating properly placed loop 22 sewn, molded, or attached to the floor mat 16 before or after the edge binding 19 is applied. A reinforcing web 20A may be added if desired. It should be understood that the loop can be made out of any practicable material having the desired strength, such as nylon, rayon, etc.

Figure 2A:
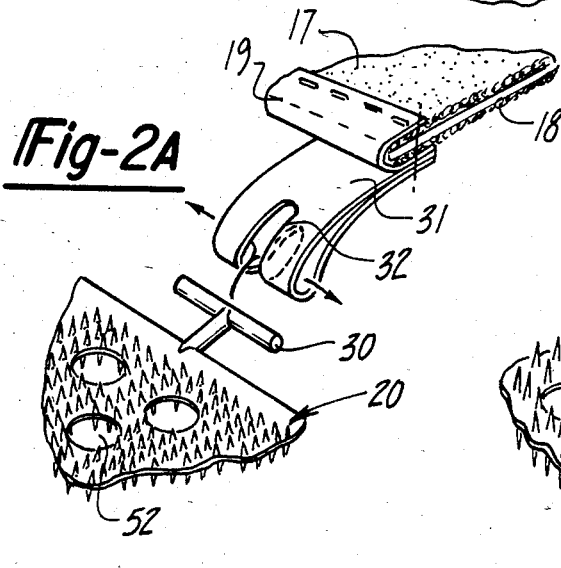
FIG. 2A is a modification of the hinged construction shown in FIG. 2.

FIG. 2A shows a modification of my invention where a strap 31 having an elongated opening 32 therein is sewn onto the floor mat 16 when the edge binding 19 is sewn thereon to join the upper carpeted surface 17 and the lower carpeted surface 18. A rounded extension 30 provided on the retainer 20 is inserted into the opening 32 of the strap 31 in a manner similar to that previously described for the insertion of the hook like tab 21 into the loops 22. It can be seen that this modification very easily pivots 360°0 to be affixable on both the top and the bottom of the floor mat 16.

Figure 3:
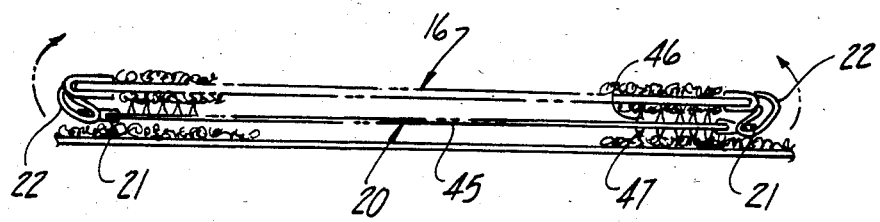
FIG. 3 is a sectional view taken in the direction of the arrows along the section line 3—3 of FIG. 1.

Referring to FIG. 3, it can be seen that by using this method of mounting, i.e. the retainer having four hook like tabs 21 with four mating loops 22 on the floor mat 16, the retainer 20 is hingedly mounted on either side of the floor mat 16 to prevent movement thereof. Once two of the hook like tabs 21 are removed from the mating loops 2, the retainer 20 can be swung through an arc of approximately 360°, and then can be reattached on the opposite side of the mat. This provides for greatly increased longevity of the carpeted surfaces of the mat, as when one side of the floor mat 16 is worn from continued use, it may simply be reversed by the method just described, with the retainer mounted to the other side, and the carpet thereafter being serviceable for another extended length of time.

Figure 5:
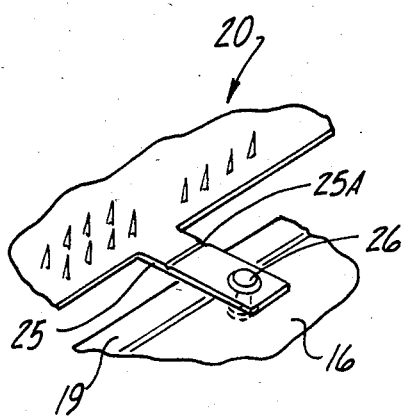
FIG. 5 is a partial perspective view showing a rivet mounting means for mounting the retainer of FIG. 1.

By referring to FIGS. 5-6 and 8-10, it can be seen that many alternate embodiments of this mounting system are possible. As shown in FIG. 5, the hook like tabs 21 and loops 22 previously used may be replaced by a living hinge 25 integrally formed on the retainer 20 in place of the hook like tab 21. In this case, the living hinge 25 may be riveted by means of rivet 26 to the floor mat 16. Be providing that the reduced portion 25A of the living hinge 25 extends over the edge of the edge binding 19, the retainer still may be pivoted for an entire 360° as previously described.

Figure 6:
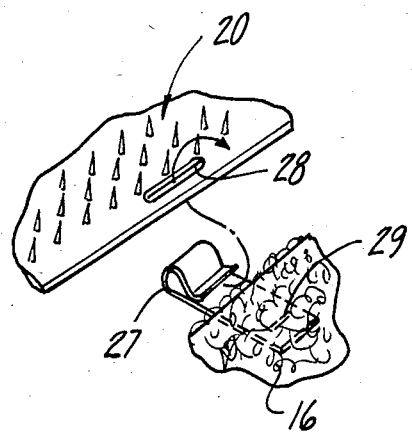
FIG. 6 is a view similar in part to FIG. 5, but showing a clip mounting means for the retainer.

FIG. 6 shows another modification of my invention whereby the mounting means is affixed to the floor mat 16 rather than the retainer 20. In this instance a clip 27 is affixed by any suitable fastening means such as the staple 29 to the floor mat 16, with a portion of the clamp extending past the edge of the edge binding 19. A slot 28 is provided in the retainer 20 and, since the clip is spring like in nature, the clips 27 are just slid into the appropriate slots 28. Since the clips are preferably flexible in nature, and may be made out of many materials well known in the art to have this property, once the retainer 20 is attached to two of the clips 27 it still may be swung approximately 360° to be affixed to either side of the floor mat 16.

Figure 8:
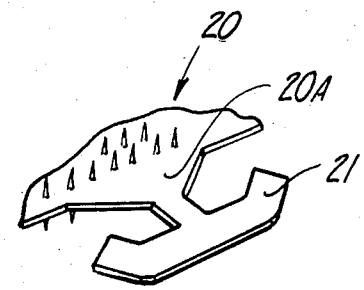
FIG. 8 is a partial perspective view of the mounting tab shown on FIG. 2.
Figure 9:
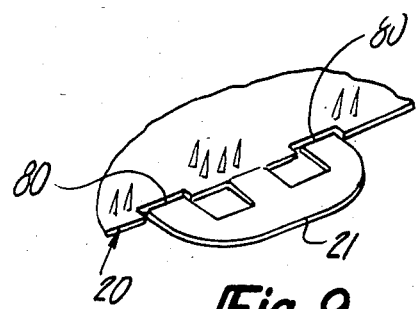
FIG. 9 is partial perspective view of a modified mounting tab.
Figure 10:
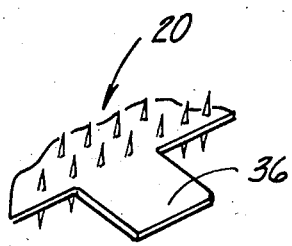
FIG. 10 is a partial perspective view of another modified mounting tab which may be used in the construction embodying my invention.

A modification very similar to the construction shown in FIG. 8 is illustrated in FIG. 9. As before, a hook like tab 21 is integrally formed near each corner of the retainer 20 and fits in a mating, properly spaced, loop 22 sewn, molded, or attached to the floor mat 17 before or after the edge binding 19 is applied.

In this modification, however, indentations 80 are provided in the edge of the retainer 20 proximate each end of the mounting tab 21 so that the edge of the mounting tab comes past the edge of the retainer to more securely grasp the loop 17. If desired, the clearance between the tab 21 and the indentations 80 may be such as to require a compression of the material of the loop 22 before it can be past through the indentation 80 and attached over the hook like tab 21.

In some applications, which will be described below, where the retainer 20 does not have to be of an appreciable thickness due to the weight of the carpet, it is possible to provide a flat tab 36 (FIG. 10) on the retainer 20 which is merely sewn in place when the edge binding 19 is applied to the mat 16.

Figure 11:
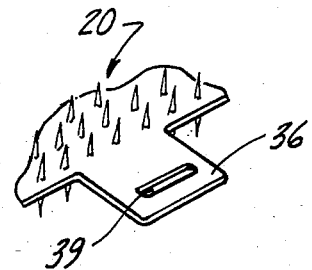
FIG. 11 is a partial perspective view of still another modification of a mounting tab which may be used in the construction of my invention.

In a modification of the construction, shown in FIG. 11, an elongated hole 39 is provided on the flat tab 36 for ease of attachment when sewing on the edge binding 19. It should also be understood that this type of tab can be attached separately, similarly to that discussed for the modifications shown in FIG. 5, by any suitable fastening means, such as a rivet, staple and the like.

It should be understood that although I have shown the use of my retainer on a floor mat having two carpeted sides, it can just as easily be used on floor mats having only one carpeted upper surface with a rubber backed, or the like, lower surface, and be well within the scope of my invention.

Also, I have shown my invention in an embodiment having four attaching means such as mating loops 22. It can be seen that more or less than four mounting means may be used, depending on the particular application to which my improved floor mat is to be put.

It should be understood that any of the many mounting means described in the present application can be used satisfactorily with the retainer of the present invention, so long as they are mounted proximate the periphery of the floor mat and retainer to provide the necessary rotation of the retainer through approximately 360 degrees. For ease of description I shall consider any of the hook-like tabs and mating loops to be the "mounting means" of the present invention.

The retainer 20 in its preferred embodiment is generally constructed in the same manner as the dual-sided retaining device disclosed in my aforementioned patent, U.S. Pat. No. 4,481,240, for an improved "Floor Mat Mounting System". As before, there is a planar surface 45 which generally divides an upper bristled surface 46 from a lower bristled surface 47. Since the retainer is intended to be reversible, in this embodiment of my invention the upper bristled surface 46 is usually made identical to the lower bristled surface 47.

Since the retainer 20 is hingedly attached to the floor mat 16, the primary consideration in the design of the retainer in this instance is to make the bristles of a length no more than three-quarters of the average length of the carpet cover material 15 since the primary consideration is preventing movement of the retainer in the carpet cover material, and not preventing movement between the retainer 20 and the floor mat 16, since the retainer 20 is attached to the floor mat. However, since the upper bristled surface will be in contact with the floor mat, and it is still desired that said upper bristled surface aid in preventing relative movement between the retainer and the floor mat, it is desirable, if possible, to choose the length of the bristles so that they meet both requirements set out in my aforementioned applications, that is to choose the length of the bristles forming the upper and lower bristled surface so that they are no more than three-quarters of the average length of the carpet cover material 15 and are no longer than one-half to three-quarters of the length of said lower carpeted surface 18 of the floor mat 16. Since in many cases the length of the carpeting used to make the floor mat 16 is approaching the length of the carpet cover material 15, meeting these requirements in many instances is not as difficult as it might seem.

However, if the floor mat 16 does not have a lower carpeted surface 18, and thus is not reversible, so that the retainer 20 will only be used on one side thereof, the upper bristled surface 46 and the lower bristled surface 47 do not need to be symmetrical, and the bristles forming the upper bristled surface 46 may be much shorter, if desired, than the bristles forming the lower bristled surface 47, being just long enough tp provide friction between the floor mat 16 and the retainer 20. In some applications it is comtemplated that no bristles at all will be needed, and my retainer will consist of a planar surface having only a lower bristled surface 47 depending downwardly therefrom. In this case, of course, all the additional durability due to the reversibility of the two-piece floor mat having carpeting on both sides will be lost.

It has been found in some cars, especially in the smaller foreign and domestic cars, that the shape of the floor pan of the automobile makes the use of a full size retainer, such as shown in FIG. 1, impracticable, as the shape of the floor will tend to raise one or more sides of the retainer 20 and give it a bulky effect. Generally reducing the size of the retainer 20 while the upper bristled surface 46 and the lower bristled surface 47 stay at a uniform height throughout the retainer has proven less desirable than putting a taper on either the upper bristled surface 46, the lower bristled surface 47, or both, for all or part of their lengths. Also, depending on the design of the floor pan, such a taper may be from the front to the back, or from one side to the other side of the retainer 20.

Figure 7:
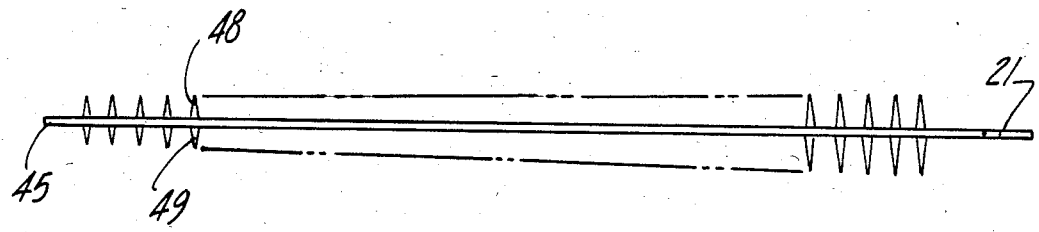
FIG. 7 is an elevational view of a tapered retainer which may be used in a construction embodying my invention.

It is contemplated that the most common kind of tapered retainer would be that shown in FIG. 7 having a planar surface 45 with an upper tapered bristled surface 48 and a lower tapered bristled surface 49. If this retainer were intended for use on a floor mat 16 having an upper carpeted surface 17 and a lower carpeted surface 18, it would again be desirable that the upper tapered bristled surface 48 be symmetrical with the lower tapered bristled surface 49 about the planar surface 45, and that the length of the bristles meet the requirement that the longest bristles be no more than three-quarters of the length of the carpet cover material 15 for the reasons just discussed in regard to the untapered retainer. Again, if possible, it is desirable that the length of the bristles also meet the requirements set forth in relationship to the lower carpeted surface 18 of the floor mat.

In any case, in the illustration shown, the height of the individual bristles decrease from right to left. Depending on the design of the floor pan, the relative height of the bristles on the left may be as little as one-eighth of the height of the average length of the lower carpeted surface.

Figure 12:
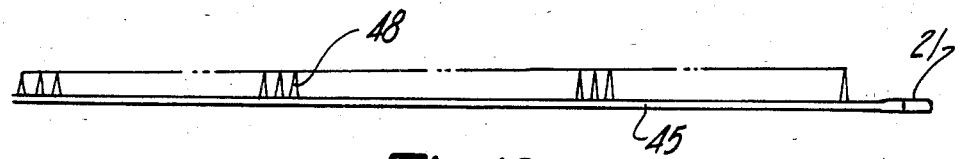
FIG. 12 is an elevational view showing another form of tapered retainer which may be used in constructions embodying my invention.
Figure 13:
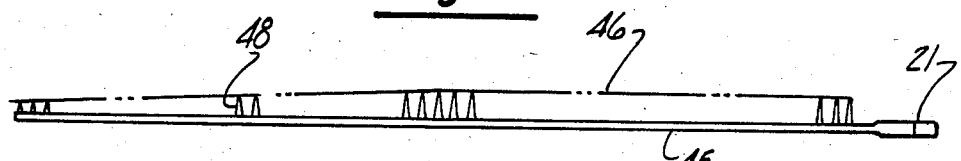
FIG. 13 is an elevational view showing another form of tapered retainer which may be used in constructions embodying my invention.
Figure 14:
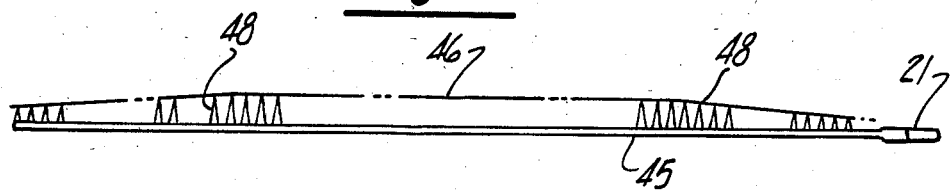
FIG. 14 is an elevational view showing another form of tapered retainer which may be used in constructions embodying my invention.

The taper, as mentioned before, may be from left to right, or front to back, or vice versa, of the dual-sided retainer 20, and as shown in FIGS. 12, 13 and 14, may be for all or part of the width or length of the retainer depending on the particular application.

No matter whether the retainer has a uniform height of bristles on its upper and lower surfaces for its entire length, as is shown in FIG. 3, a uniform taper, as shown in FIG. 7, or some other configuration, as shown in FIGS. 12, 13 and 14, it is, in some instances, desirable to provide perforations in the retainer to reduce the weight thereof in view of the current emphasis of keeping the weight of the automobile to a minimum, and thus increasing fuel economy. Such perforations may be varied in number as well as in shape.

Figure 2:
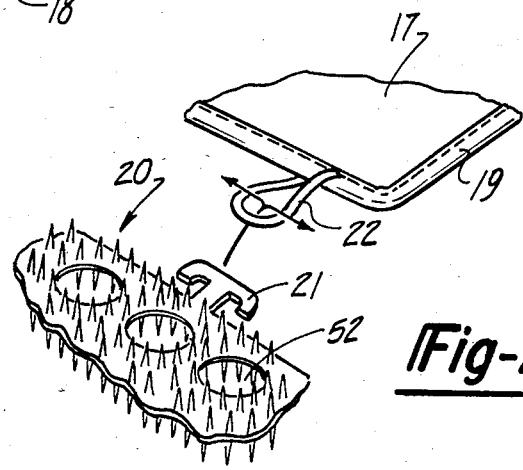
FIG. 2 is an enlarged, partial perspective view showing the hinged construction used to hold the retainer of FIG. 1 in place.
Figure 4:
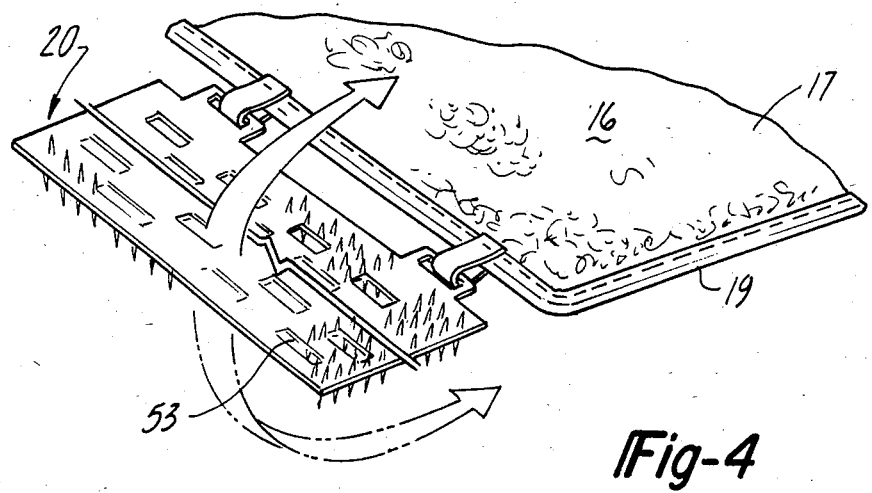
FIG. 4 is a partial perspective view showing a modified mounting means for the retainer of FIG. 1.

As shown in FIG. 2, a plurality of round holes 52 may be provided in the retainer or, if desired, as shown in FIG. 4 a plurality of rectangular holes 53 may be provided. The number and shape of holes may vary depending upon the particular application to which the floor mat is to be put, and the amount of weight it is desired to save.

If perforations are provided in the retainer, it is obvious that the overall density of the retainer will be much less than the design criteria set forth in my previous applications. It is still preferable, however, if possible, that the density of the bristles on the portions of the retainer still having them are from fifty to one-hundred percent of the density of the lower carpeted surface 18 of the floor mat 16.

Thus, by providing a novel retaining device, and means of attaching the same to an automotive floor mat, I have invented a device which is simple, practical, economical and attractive in appearance, and which solves the problem of movement of the floor mat during operation of the vehicle, as well as during entry and exiting by the occupants of a motor vehicle.

I claim:

1. A floor mat construction including:
   (a) at least one carpeted surface;
   (b) mounting means for securing a retainer to said floor mat; and
   (c) a retainer having bristles on at least one side thereof hingedly attached to said floor mat by said mounting means for rotation through approximately 360°.

2. The device defined in claim 1, wherein said floor mat construction includes:
   (a) an upper carpeted surface;
   (b) a lower carpeted surface; and (c) an edge binding joining said upper and said lower carpeted surface.

3. The device defined in any one of claims 1–2, wherein said retainer includes:
   (a) a planar surface; and
   (b) a lower bristled surface depending downwardly therefrom.

4. The device defined in claim 3, wherein the bristles forming said lower bristled surface are formed in such a manner to provide a taper to at least part of said lower bristled surface.

5. The device defined in claim 3, wherein said retainer includes:
   (a) an upper bristled surface depending from said planar surface.

6. The device defined in claim 5, wherein the bristles forming said upper bristled surface are formed in such a manner to provide a taper to at least part of said upper bristled surface.

7. The device defined in claim 5, wherein the length of the bristles forming said lower bristled surface is no more than three quarters of the average length of the carpet cover material.

8. The device defined in claim 7, wherein said lower bristled surface is symmetrical with said upper bristled surface about said planar surface.

9. The device defined in claim 8, wherein the length of the bristles forming said upper bristled surface is no longer than one-half to three-quarters of the length of said lower carpeted surface.

10. The device defined in claim 7, wherein said mounting means includes:
    (a) at least one hook like tab provided on said retainer; and
    (b) at least one mating loop affixed about the perimeter of said floor mat.

11. The device defined in claim 7, wherein said mounting means include:
    (a) at least one rounded extension provided on said retainer; and
    (b) at least one strap attached proximate the perimeter of said floor mat, said strap having a suitable opening therein.

12. The device defined in claim 7, wherein said mounting means includes:
    (a) at least one living hinge provided on said retainer and fixedly attached to said floor mat.

13. The device defined in claim 7, wherein said mounting means includes:
    (a) at least one clip fixedly attached to said floor mat; and
    (b) at least one mating clip opening provided in said retainer.

14. The device defined in claim 7, wherein said mounting means include:
    (a) at least one strap attached proximate the perimeter of said floor mat, said strap having a suitable opening therein; and
    (b) at least one flat extension provided on said retainer.

15. The device defined in claim 7, wherein said mounting means includes:
    (a) at least one flat tab provided on said retainer and fixedly attached to said floor mat.

16. The device defined in claim 14, wherein said flat tab has an elongated hole provided therein.

17. The device defined in claim 7, wherein said mounting means include:
    (a) at least one hook like tab provided on said retainer;
    (b) indentations provided in the edge of the retainer proximate the ends of each hook like tab; and
    (c) at least one mating loop affixed about the perimeter of said floor mat.

18. The device defined in claim 9, wherein the density of the bristles forming said upper bristled surface and said lower bristled surface is from fifty to one-hundred percent of the density of said lower carpeted surface where bristles are provided on said retainer.

19. The device defined in claim 10, and having suitable openings provided in said retainer to reduce weight.

20. the device defined in claim 11, and having suitable openings provided in said retainer to reduce weight.

21. The device defined in claim 12, and having suitable openings provided in said retainer to reduce weight.

22. The device defined in claim 13, and having suitable openings provided in said retainer to reduce weight.

23. The device defined in claim 14, and having suitable openings provided in said retainer to reduce weight.

24. The device defined in claim 15, and having suitable openings provided in said retainer to reduce weight.

25. The device defined in claim 16, and having suitable openings provided in said retainer to reduce weight.

26. The device defined in claim 17, and having suitable openings provided in said retainer to reduce weight.

* * * * *

UNITED STATES PATENT AND TRADEMARK OFFICE
CERTIFICATE OF CORRECTION

PATENT NO. : 4,588,628
DATED : May 13, 1986
INVENTOR(S) : David W. Roth

It is certified that error appears in the above-identified patent and that said Letters Patent are hereby corrected as shown below:

In Column 1, Line 62, delete "an" and insert "in".
In Column 2, Line 49, delete "on" and insert "in".
In Column 3, Line 43, delete "360°0" and insert "360°".
In Column 3, Line 67, delete "Be" and insert "By"
In Column 4, Line 30, Delete "past" and insert "passed".
In Column 5, Line 39, delete "tp" and insert "to".

Signed and Sealed this

Twenty-fourth Day of February, 1987

Attest:

DONALD J. QUIGG

Attesting Officer   Commissioner of Patents and Trademarks